United States Patent
Morinaga

[19]

[11] Patent Number: 6,137,685
[45] Date of Patent: Oct. 24, 2000

[54] PORTABLE ELECTRONIC INFORMATION DEVICE

[75] Inventor: Kenichi Morinaga, Osaka, Japan

[73] Assignee: Funai Electric Co., LTD, Osaka, Japan

[21] Appl. No.: 09/143,808

[22] Filed: Aug. 31, 1998

[30] Foreign Application Priority Data

Sep. 1, 1997 [JP] Japan .................................. 9-236150

[51] Int. Cl.⁷ .............................. E05C 7/00; A05C 1/12; A47B 81/00; H05K 5/00; H05K 7/16
[52] U.S. Cl. .......................... 361/727; 361/681; 361/685; 361/686; 361/726; 361/727; 312/223.1; 312/223.2; 292/8; 292/27; 292/176; 292/178
[58] Field of Search ................................... 361/681, 685, 361/686, 726, 727; 292/8, 27, 176, 178; 312/223.1, 223.2

[56] References Cited

U.S. PATENT DOCUMENTS

| | | | |
|---|---|---|---|
| 3,709,538 | 1/1973 | Seitz et al. | 292/128 |
| 4,758,031 | 7/1988 | Wolf | 292/111 |
| 5,264,986 | 11/1993 | Ohgami et al. | 361/740 |
| 5,319,519 | 6/1994 | Sheppard et al. | 361/685 |
| 5,757,616 | 5/1998 | May et al. | 361/683 |

FOREIGN PATENT DOCUMENTS 5-75860  3/1992  Japan .

*Primary Examiner*—Leo P. Picard
*Assistant Examiner*—Tung Minh Bui
*Attorney, Agent, or Firm*—Lackenbach Siegel

[57] ABSTRACT

A portable electronic information device for performing information processing, data communication or the like. In the device, a slot is housed within a longitudinal rectangular housing recess formed at the rear portion of a lower wall of a device body so as to be able to be ejected therefrom and buried therein. A spring is provided within the housing recess so as to urge the slot outward. A locking unit is provided for locking the slot within the housing recess against the urging force of the spring. A guide frame is pivotally attached to the front portion of the lower wall of the device body so as to be erectable therefrom. A card-shaped information medium is attached through a through-hole of the erected guide frame to the slot which protrudes outside from the housing recess.

10 Claims, 7 Drawing Sheets

PORTABLE ELECTRONIC INFORMATION DEVICE

BACKGROUND OF THE INVENTION

1. Field of the Invention

The present invention relates to a portable electronic information device called a portable information terminal or the like for performing information processing, data communication or the like.

2. Description of the Related Art

Conventionally, there has been proposed a portable electronic information device shown in FIG. 10 as an example of such a kind of portable electronic information device. According to such a portable electronic information device, a movable member 2 is provided within a device body 1 having various kinds of functions such as information processing, data communication or the like. An opening portion 3 is formed at the side wall of the device body 1 in opposite to the movable member 2. A card-shaped information medium 4 called an IC (integrated circuit) card having a memory function or the like is inserted into the opening portion 3 and attached to the movable member 2, whereby, by controlling a control portion (not shown) within the device body 1, information processing can be performed using the memory or the like of the card-shaped information medium 4 coupled to the control portion through the movable member 2. In the figure, reference numeral 5 designates a monitor formed by a liquid crystal screen provided on an upper surface 1a of the device body 1.

Since such a conventional device is arranged in a manner that the card-shaped information medium 4 is attached to the movable member 2 provided within the device body 1 through the opening portion 3 formed at the side wall of the device body 1, the height H of the device body 1 becomes large.

Accordingly, it is proposed to provide the movable member 2 at a lower wall 1b of the device body 1 on the basis of the technique disclosed in Japanese Utility Model Unexamined Publication No. Hei. 5-75860.

According to such a proposed arrangement, it is possible to reduce the height H of the device body 1. However, since the movable member 2 protrudes outward from the lower wall 1a of the device body 1, the device becomes bulky and it becomes inconvenient to carry the device.

SUMMARY OF THE INVENTION

In view of the aforesaid problem of the conventional portable electronic information device, an object of the present invention is to provide a portable electronic information device which can be made small in size so as not to be bulky at the time of carrying it.

In order to achieve the aforesaid object, the present invention provides a portable electronic information device comprising: a device body having a housing recess formed therein; a movable member which is housed within the housing recess so as to be able to be ejected therefrom and buried therein; and a card-shaped information medium which is attached to the movable member protruded outward from the housing recess so as to be able to be inserted therein and pulled out therefrom.

According to this arrangement, at the time of using the device, the movable member is protruded out of the housing recess of the device body and the card-shaped information medium is attached to the movable member. At the time of not using the device, the movable member is housed within the housing recess.

In this case, by housing the movable member within the housing recess of the device body, the device can be miniaturized so as not to be bulky and it becomes convenient to carry the device.

DETAILED DESCRIPTION OF THE PREFERRED EMBODIMENTS

Figure 1:
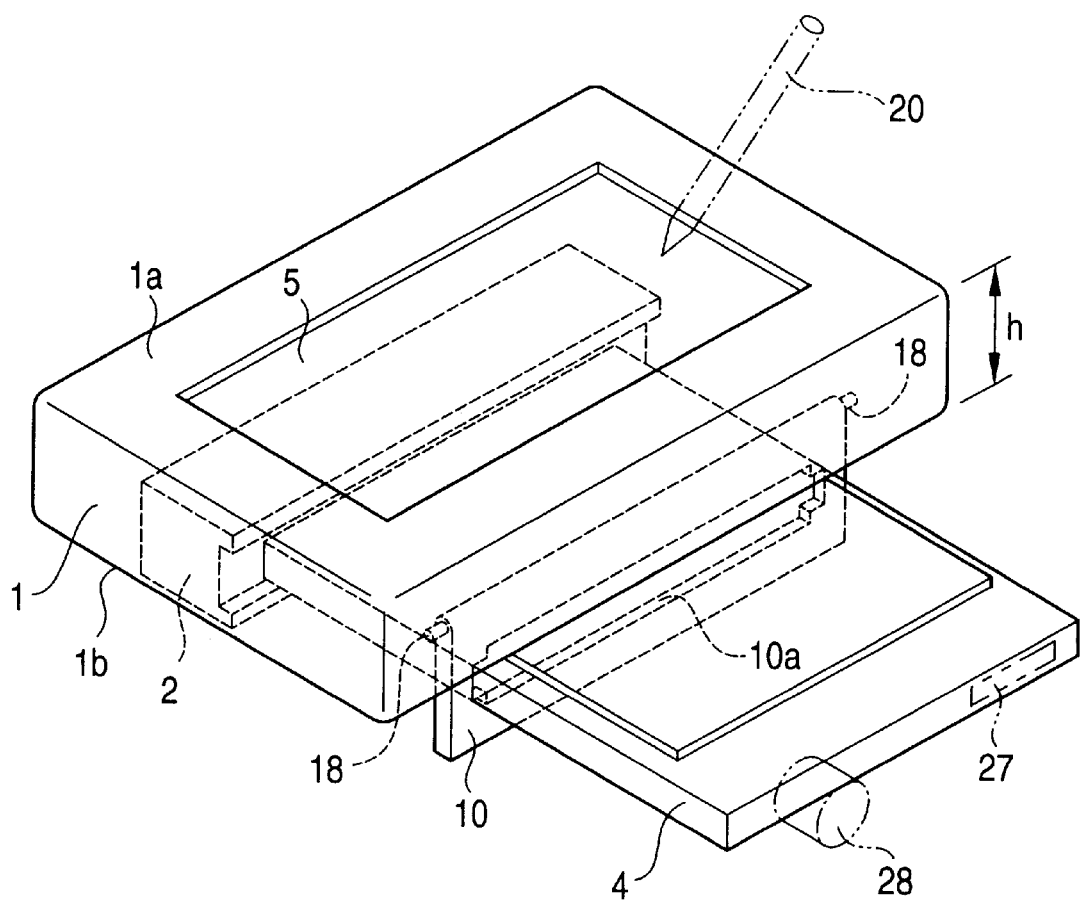
FIG. 1 is a perspective view showing the using state of a portable electronic information device according to a first embodiment of the present invention.
Figure 2:
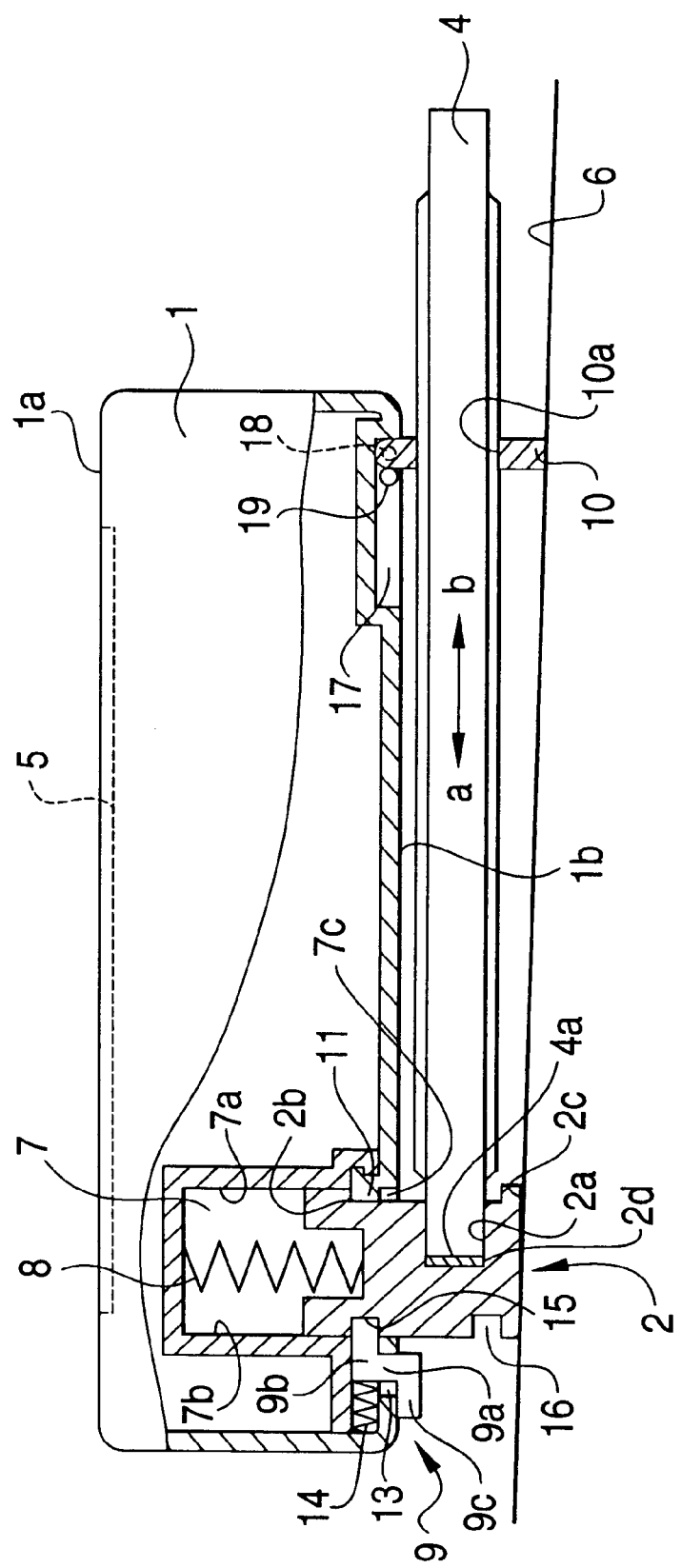
FIG. 2 is a cross sectional view of the portable electronic information device according to the first embodiment.

Embodiments of the present invention will be described with reference to the accompanying drawings. FIGS. 1 and 2 are views each showing the state that the portable electronic information device according to the first embodiment of the present invention is placed on a table 6. A movable member 2 is housed within a longitudinal rectangular housing recess 7 formed at the rear portion of a lower wall 1b of a device body 1 so as to be able to be ejected therefrom and retracted therein. A spring 8 is provided within the housing recess 7 so as to urge the movable member 2 outward. A locking means 9 is provided for locking the movable member 2 within the housing recess 7 against the urging force of the spring 8. A guide frame 10 for guiding a card-shaped information medium 4 is pivotally attached to the front portion of the lower wall 1b so as to be erectable therefrom.

The movable member 2 is arranged so as to be slidable along guide walls 7a and 7b formed on the inner wall of the housing recess 7. A fitting recess 2a for fitting the tip portion of the card-shaped information medium 4 therein is formed at the front wall of the slot. A concave step portion 2b is formed at the front wall of the base end portion of the movable member 2, and a slip-out prevention projection 11 is provided at an opening portion 7c of the housing recess 7 in opposite to the concave step portion 2b. Further, a lid portion 2c is provided at the tip portion of the movable member 2 so that the lid portion covers the opening portion 7c of the housing recess 7 when the movable member 2 is retracted within the housing recess 7 (see FIG. 3).

The locking means 9 includes, at the center portion of the rear end of the lower wall 1b of the device body 1, a locking body 9a which is movably inserted into a slot 13 formed along the inserting and pulling-out directions a and b of the card-shaped information medium 4 and urged against the movable member 2 by a spring 14; a locking piece 9b extending from the one end of the locking body 9a to the movable member 2; and an operation portion 9c integrally formed at the other end of the locking body 9a so as to protrude therefrom. A pair of locking holes 15 and 16 are formed at the rear wall of the movable member 2 with a predetermined distance therebetween in opposite to the locking piece 9b. When the locking piece 9b is fitted into the base end side locking hole 15, the movable member 2 is locked so that the movable member is not accidentally retracted within the housing recess 7 (see FIG. 2). In contrast, when the locking piece 9b is fitted into the tip portion side locking hole 16, the movable member 2 is locked so that the slot does not protrude from the housing recess 7 (see FIG. 3).

The guide frame 10 is formed in a transversely elongated substantially-rectangular frame shape in a front view thereof and provided at the center portion thereof with a through-hole 10a having the substantially same configuration as the cross sectional shape of the card-shaped information medium 4. The guide frame is disposed within a housing concave portion 17 formed at the lower wall 1b of the device body 1 along the directions perpendicular to the inserting and pulling-out directions a and b of the card-shaped information medium 4. The base end portion of the guide frame is swingably pivotally attached to the device body 1 through a pivot 18. In FIG. 2, reference numeral 19 designates a semi-spherical stopper provided on the inner wall of the housing concave portion 17 so as to protrude therefrom in adjacent to the guide frame 10. The stopper serves to accidentally collapse the guide frame 10 being erected, and also serves to urge thereto the both side walls of the guide frame 10 being housed within the housing concave portion 17 so that the guide frame 10 does not come out of the housing concave portion 17 accidentally.

As shown in FIG. 1, a transparent tablet is attached to a monitor 5. Various kinds of information processing can be performed by touching the transparent tablet by using an operation pen 20.

Figure 3:
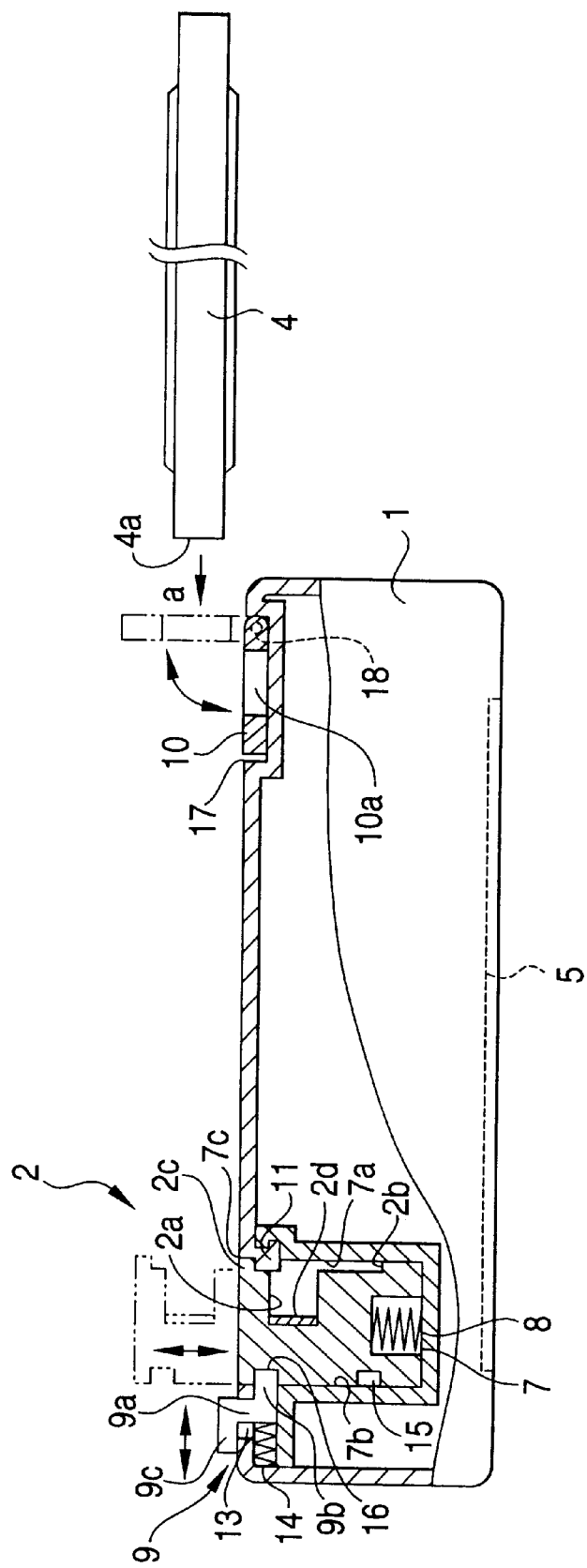
FIG. 3 is a cross sectional view showing the state of the portable electronic information device is not used according to the first embodiment.
Figure 4:
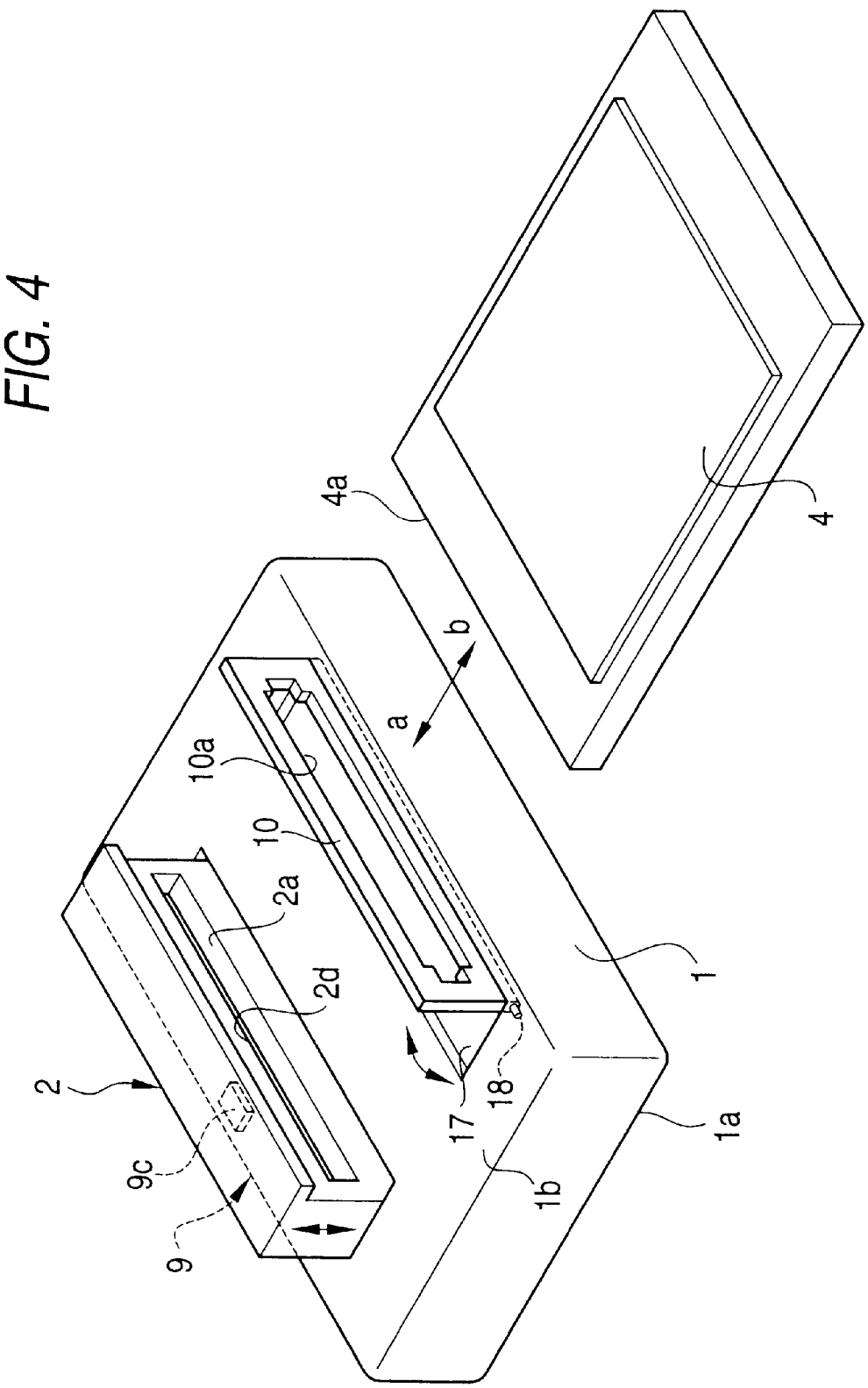
FIG. 4 is a perspective view showing the insertion and pulled-out state of the portable electronic information device according to the first embodiment.

In the aforesaid arrangement, at the time of using the device, the operation portion 9c of the locking means 9 is moved backward against the tension of the spring 14 from the state shown by the solid line in FIG. 3 thereby to disengage the locking piece 9b from the locking hole 16. Thus, the movable member 2 protrudes outward from the housing recess 7 due to the restoring force of the spring 8 and the concave step portion 2b abuts against the slip-out prevention projection portion 11 (see the phantom line in FIG. 3 and FIG. 4). Then, when the backward moving force applied to the operation portion 9c is removed, the locking piece 9b is fitted into the locking hole 15 due to the restoring force of the spring 14, so that the movable member 2 is prevented from being accidentally retracted into the housing recess 7. Thereafter, the guide frame 10 is erected (see the phantom line in FIG. 3 and FIG. 4), then the tip portion of the card-shaped information medium 4 is fitted into the fitting recess 2a of the movable member 2 through the through-hole 10a of the guide frame 10. Thus, the terminal 4a of the card-shaped information medium 4 abuts against the terminal 2d of the movable member 2, so that the card-shaped information medium 4 is connected to a control portion (not shown) of the device body 1 formed by a microcomputer.

Thereafter, the device body 1 is turned over and placed on the table 6 by means of the movable member 2 and the guide frame 10 as shown in FIGS. 1 and 2. In this state, when the transparent tablet of the monitor 5 is touched by the operation pen 20, various kinds of information processing such as table calculation, preparation of address table, word processor operation or the like can be performed.

At the time that the device is no longer used, the device body 1 is turned over again so that the movable member 2 and the guide frame 10 are directed upward. Then, the card-shaped information medium 4 is drawn out from the movable member 2 and the guide frame 10, and the guide frame 10 is collapsed and housed within the housing concave portion 17. Further, the operation portion 9c of the locking means 9 is moved backward against the tension of the spring 14 and the movable member 2 is pushed down against the tension of the spring 8. Thereafter, the backward moving force applied to the operation portion 9c is removed, and the locking piece 9b is fitted into the locking hole 16 (see the solid line in FIG. 3).

Figure 10:
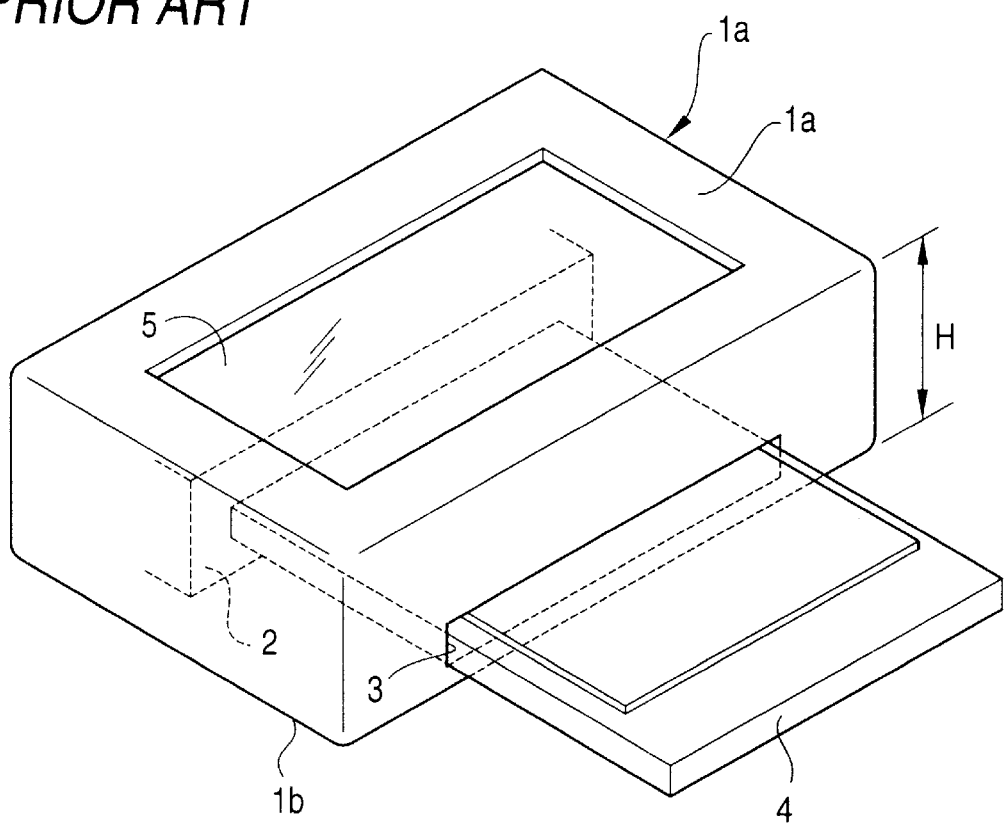
FIG. 10 is a perspective view showing an example of a conventional portable electronic information device.

According to the aforesaid arrangement, since the movable member 2 is adapted to be housed within the housing concave portion 17, the height h of the device body 1 (see FIG. 1) is made smaller than that of the conventional device body (see FIG. 10) and hence the device can be miniaturized so as not to be bulky and it becomes convenient to carry the device.

Further, the movable member 2 is securely locked within the housing recess 7 by means of the locking means 9 and the opening portion 7c of the housing recess 7 can be covered by the lid portion 2c (see FIG. 3). Furthermore, by merely unlocking the movable member, the movable member 2 can be slid along the guide walls 7a and 7b due to the tension of the spring 8 and protrude out of the housing recess 7. In this state, when the locking means 9 is made engaged with the movable member 2 thus protruded, the movable member 2 can be prevented from being accidentally retracted within the housing recess 7 (see FIG. 2).

The card-shaped information medium 4 can be easily attached to the movable member 2 through the guide frame 10. Furthermore, since the guide frame 10 can be collapsed and housed within the housing concave portion 17, the device can be made compact without being bulky and the appearance of the device can be kept good.

Figure 5:
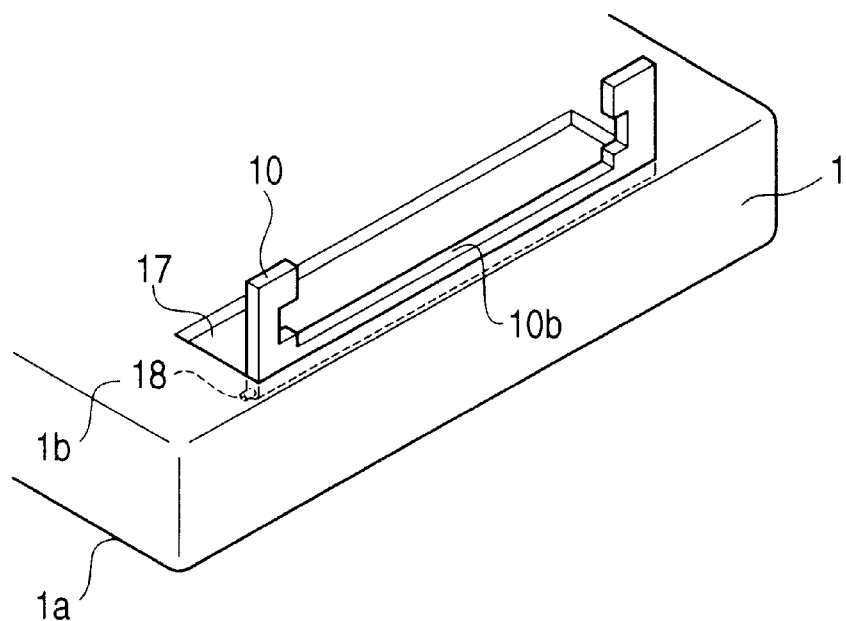
FIG. 5 is a perspective view showing the main portion of a portable electronic information device according to a second embodiment of the present invention.

According to the first embodiment of the present invention, although the guide frame 10 is formed in a transversely elongated substantially-rectangular frame shape in a front view thereof, the present invention is not limited thereto. That is, as shown in FIG. 5, the guide frame 10 may be formed in a transversely elongated substantially U-shape in a front view thereof, and a concave groove 10b for passing the card-shaped information medium 4 therethrough may be formed at center portion thereof. According to such an arrangement, the card-shaped information medium 4 passing through the concave groove 10b can be easily attached to the movable member 2 (second embodiment).

Figure 6:
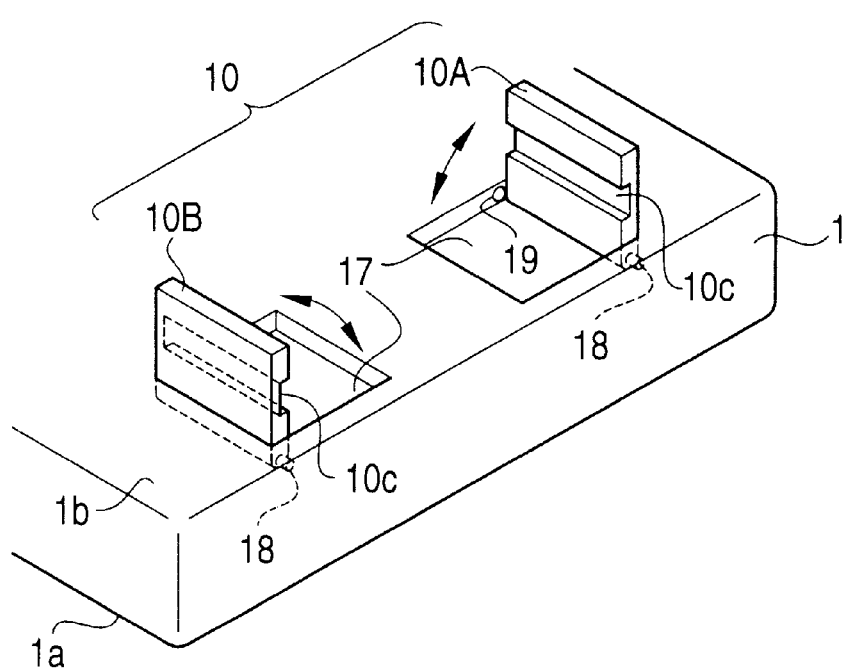
FIG. 6 is a perspective view showing the main portion of a portable electronic information device according to a third embodiment of the present invention.

Alternatively, as shown in FIG. 6, the guide frame 10 may be formed by a pair of right and left guide frame portions 10A and 10B disposed in parallel to each other with a predetermined distance therebetween, and guide grooves 10c may be formed at opposite side walls of the guide frame portions 10A and 10B for guiding the opposite side end portions of the card-shaped information medium 4, respectively. According to such an arrangement, the card-shaped information medium 4 can be easily attached to the movable member 2 by passing the opposite side end portions of the card-shaped information medium 4 through the guide grooves 10c (third embodiment).

Figure 7:
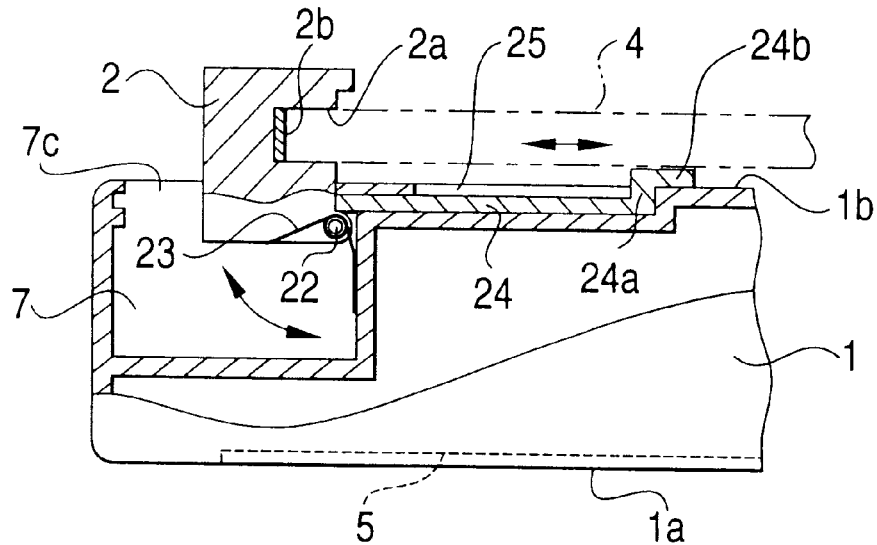
FIG. 7 is a cross sectional view showing the main portion of a portable electronic information device according to a fourth embodiment of the present invention.
Figure 8:
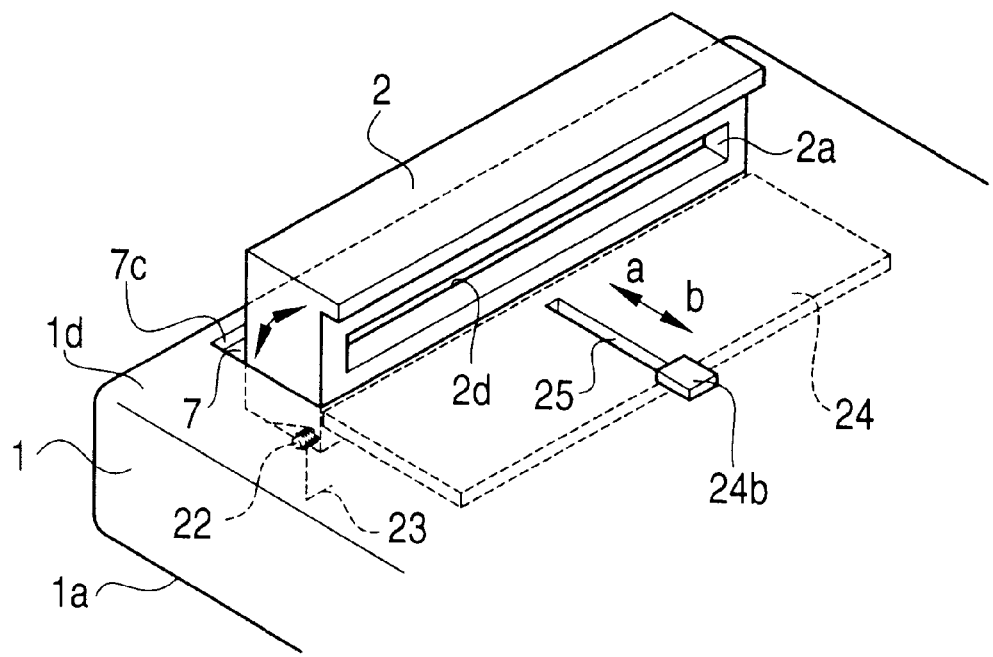
FIG. 8 is a perspective view showing the main portion of the portable electronic information device according to the fourth embodiment.

Further, although the movable member 2 is arranged so as to be slidable, the present invention is not limited thereto. That is, as shown in FIGS. 7 and 8, the movable member 2 may be pivotally mounted within the housing recess 7 through a pivot 22, a spring 23 may be provided for urging the movable member 2 outside of the housing recess 7, and an opening/closing lid 24 may be provided which pushes the movable member 2 within the housing recess 7 against the urging force of the spring 23 when it covers the opening portion 7c of the housing recess 7 so as to be freely able to close and open it. Further, a projection portion 24a protruding from the opening/closing lid 24 may be provided so that the projection portion passes through a slit 25 formed at the lower wall 1b of the device body 1 along the inserting and pulling-out directions a and b of the card-shaped information medium 4, and an operation portion 24b may be formed at the projection portion 24a (fourth embodiment).

Figure 9:
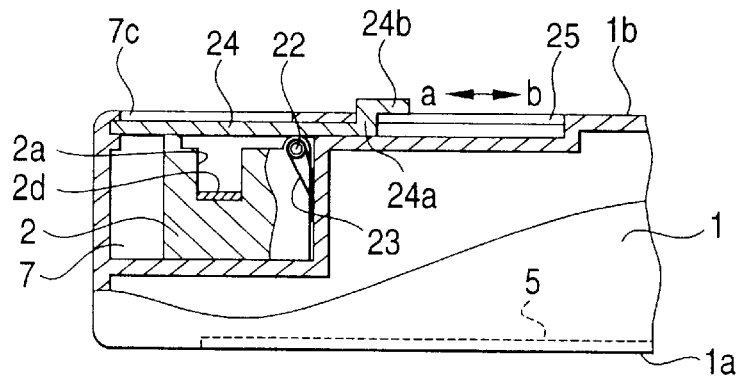
FIG. 9 is a cross sectional view of the main portion of the portable electronic information device according to the fourth embodiment showing the state where the movable member is housed.

According to such an arrangement of the fourth embodiment, as shown in FIG. 9, when the operation portion 24b is moved to close the opening/closing lid 24 thereby to cover the opening portion 7c of the housing recess 7, the movable member 2 can be securely housed within the housing recess 7. Further, as shown in FIGS. 7 and 8, when the opening/closing lid 24 is merely opened, the movable member 2 can be rotated by the urging force of the spring 23 and protrude out of the housing recess 7.

As shown in FIG. 1, a modem 27 may be provided at the card-shaped information medium 4. In such an arrangement, data communication can be performed easily through a line connected to the modem 27.

Further, as shown in FIG. 1, an electronic camera 28 may be provided at the card-shaped information medium 4. In such an arrangement, an image can be photographed by using the electronic camera 28, and an address table with face pictures can be prepared easily by combining the photographed images and an address table.

According to the present invention, by housing the slot within the housing recess of the device body, the device can be miniaturized so as not to be bulky and it becomes convenient to carry the device.

What is claimed is:

1. A portable electronic information device comprising:
    a device body having a housing recess and a concave portion formed therein;
    a movable member which is housed within said housing recess so as to be able to be ejected therefrom and retracted therein;
    a card-shaped information medium which is attached to said movable member protruded outward from said housing recess so as to be able to be inserted therein and pulled out therefrom; and
    a guide frame for guiding said card-shaped information movably attached to said device body so as to be erectable therefrom, said concave portion serving to house said guide frame therein.

2. The portable electronic information device according to claim 1, wherein said movable member is arranged so as to be slidable along guide walls formed in said housing recess, a spring for urging said slot outward from said housing recess is provided, and locking means is provided for locking said movable member within said housing recess against an urging force of the spring.

3. The portable electronic information device according to claim 1, wherein a lid portion is provided at a tip portion of said movable member which covers an opening portion of said housing recess when said movable member is buried within said housing recess.

4. The portable electronic information device according to claim 1, wherein said movable member is pivotally attached within said housing recess, a spring is provided for urging said movable member outward from said housing recess, and an opening/closing lid is provided which pushes said movable member within said housing recess against an urging force of the spring when it covers an opening portion of said housing recess so as to be freely able to close and open the opening portion.

5. The portable electronic information device according to claim 1, wherein said guide frame is formed in a transversely elongated substantially-rectangular frame shape in a front view thereof and provided at a center portion thereof with a through-hole having a substantially same configuration as a cross sectional shape of said card-shaped information medium.

6. The portable electronic information device according to claim 1, wherein said guide frame is formed by a pair of right and left guide frame portions disposed in parallel to each other with a predetermined distance therebetween, and guide grooves are formed at opposite side walls of the guide frame portions for guiding opposite side end portions of said card-shaped information medium, respectively.

7. The portable electronic information device according to claim 1, wherein said guide frame is pivotally attached to said device body.

8. The portable electronic information device according to claim 2, wherein said locking means is provided with a retraction prevention mechanism which engages with said slot protruded outward from said housing recess to prevent said movable member from being retracted within said housing recess.

9. A portable electronic information device comprising:
    a device body having a housing recess and a concave portion formed therein;
    a movable member which is housed within said housing recess so as to be able to be ejected therefrom and retracted therein;
    a card-shaped information medium which is attached to said movable member protruded outward from said housing recess so as to be able to be inserted therein and pulled out therefrom; and
    a guide frame for guiding said card-shaped information movably attached to said device body so as to be erectable therefrom, said concave portion serving to house said guide frame therein, said guide frame being formed in a transversely elongated substantially U-shape in a front view thereof and provided at a center portion thereof with a concave groove for passing said card-shaped information medium therethrough.

10. The portable electronic information device according to claim 9, wherein said guide frame is pivotally attached to said device body.

* * * * *